US007158903B2

(12) United States Patent
Kushnir et al.

(10) Patent No.: US 7,158,903 B2

(45) Date of Patent: Jan. 2, 2007

(54) METHODS FOR QUANTITATIVE ANALYSIS BY TANDEM MASS SPECTROMETRY

(75) Inventors: Mark M. Kushnir, Salt Lake City, UT (US); Alan L. Rockwood, Provo, UT (US); Gordon J. Nelson, Sandy, UT (US)

(73) Assignee: University of Utah, Salt Lake City, UT (US)

( * ) Notice: Subject to any disclaimer, the term of this patent is extended or adjusted under 35 U.S.C. 154(b) by 0 days.

(21) Appl. No.: 10/508,068

(22) PCT Filed: Mar. 14, 2003

(86) PCT No.: PCT/US03/08042

§ 371 (c)(1),
(2), (4) Date: Mar. 22, 2005

(87) PCT Pub. No.: WO03/079008

PCT Pub. Date: Sep. 25, 2003

(65) Prior Publication Data

US 2005/0165560 A1 Jul. 28, 2005

Related U.S. Application Data

(60) Provisional application No. 60/364,436, filed on Mar. 15, 2002.

(51) Int. Cl.
*G06F 19/00* (2006.01)

(52) U.S. Cl. ............................ 702/86; 436/43; 73/1.02

(58) Field of Classification Search .................. 702/86, 702/182–185, 23–24, 189; 436/43; 73/1.02, 73/1.06, 19.01, 23.2, 23.21–23.22, 23.4
See application file for complete search history.

(56) References Cited

U.S. PATENT DOCUMENTS

| | | | | |
|---|---|---|---|---|
| RE28,738 | E | 3/1976 | Kulberg et al. | |
| 6,393,368 | B1 | 5/2002 | Ito et al. | |
| 6,408,250 | B1 | 6/2002 | Grate et al. | |
| 6,428,956 | B1 | 8/2002 | Crooke et al. | |
| 6,961,599 | B1 * | 11/2005 | Lambert et al. | 600/318 |
| 2002/0019056 | A1 | 2/2002 | Shushan et al. | |
| 2002/0031773 | A1 | 3/2002 | Ammon | |
| 2002/0102737 | A1 | 8/2002 | Millington et al. | |
| 2002/0115056 | A1 | 8/2002 | Goodlett | |

OTHER PUBLICATIONS

Bennett et al., "Simultaneous analysis of butene isomer mixtures using process mass spectrometry." *J Am Soc. Mass Spectrom.*2000, 11, 1079-85.

Borth, S.; Hansel, W.; Rosner, P.; Junge, T., "Regioisomeric differentiation of 2, 3- and 3,4- methylenedioxy ring-substituted phenylalkylamines by gas chromatography/tandem mass spectrometry." *J Mass Spectrom.* 2000, 35, 705.

(Continued)

*Primary Examiner*—Edward Raymond
(74) *Attorney, Agent, or Firm*—Richard F. Trecartin; Dorsey & Whitney LLP

(57) ABSTRACT

The present invention provides methods for high throughput analysis of analytes in complex mixtures for unresolved chromatographic peaks including specific embodiment for summing intensities for each mass transition of interest over a selected chromatographic peak (50) to generate a signal corresponding to total intensity for each transition (55, 60). The intensities are deconvoluted into intensities of individual analytes (65, 70), based on branching ratios acquired from authentic standards, and a comparison to calibration curve is performed to obtain a quantitative concentration measurement of a particular analyte in a sample.

56 Claims, 5 Drawing Sheets

OTHER PUBLICATIONS

Buchanan, N.B.; Munzer, J.; Thoene, J.G. Positive-ion thermospray liquid chromatography-mass spectrometry: detection of organic acidurias. *J Chromatogr B* 1990, 534, 1-11.

Cornbleet, et. al. "Incorrect least-squares regression coeffiecients in method-comparison analysis" *Clin. Chem.* 1979 25:432-8.

Desaire, H. L.; Leary J. A. "Multicomponent quantification of diastereomeric hexosamine monosaccharides using ion trap tandem mass spectrometry." *Anal. Chem* 1999, 71, No. 19, pp. 4142-4147.

K.L. Busch, G.L. Glish, and S.A. McLuckey. Mass Spectrometry/ Mass Spectrometry Techniques And Application Of Tandem Mass Spectrometry. *VCH Publishers, Inc.*, 1988.

Kajia, M.; Niwa, T.; Watanabe, K. Analysis of urinary organic acids by liquid chromatography-atmospheric pressure chemical ionization mass spectrometry. *J Chromatogr B* 1993, 622, 263-268.

Krishna, P.; Prabhakar, S.; Vairamani, M. "Differentiation of derivatized leucine and isoleucine by tandem mass spectrometry under liquid secondary ion mass spectral conditions." *Rapid Commuin Mass Spectrom.* 1998, 12, 1429-1434.

Kushnir, et al., "Analysis of Dicarboxylic Acids by Tandem Mass Spectography. High Throughput Quantitative Measurement of Methylmalonic Acid in Serum, Plasma and Urine", *Clinical Chemistry* 47:11 1993-2002 (2001).

Mills, G.A.; Walker, V.; Cleanch, M.R.; Parr, V.C. Analysis of urinary organic acids by plasmaspray liquid chromatography/ mass spectrometry. *Biomed Environ Mass Spectrom* 1988, 16, 259-61.

Price, Phil, "Standard Definitions of Terms Relating to Mass Spectrometry" A Report from the Committee on Measurements and Standards of the American Society for Mass Spectometry, *J. Am. Soc. Mass Spectrom* 1991, 2, 336-348.

Schnier, P. D. W., E. R. "Analysis of isomeric mixtures using blackbody infrared radiative dissociation: Determining isomeric purity and obtaining individual tandem mass spectra simultaneously." *Anal. Chem* 1998, 70, 3033-3041.

Seymour, J. L.; Turechek, F. "Distinction and quantitation of leucine-isoleucine isomers and lysine—glutamine isobars by electrospray ionization tandem mass spectrometry (MS n , n 5 2, 3) of copper(II)-diimine complexes." *J. Mass Spectrom.* 2000, 35, 566-571.

Sheeley, D.M.; Reinhold, V.N. "Structural Characterization of Carbohydrate Sequence, Linkage, and Branching in a Quadrupole Ion Trap Mass Spectrometer: Neutral Oligosaccharides and N-Linked Glycans." *Anal. Chem.* 1998, 70, 3053.

Todd, *Journal of Pure Applied Chemistry*, 1991, 63, 1541-1566.

Vouros, P.; Muller, D.R.; Richter, W.J. "Low-energy collision-induced dissociation of B1-type sugar ions formed from peracetylated methyl pentosides and methyl 6-deoxyhexosides." *J. Mass Spectrom.* 1999, 34, 346.

Wan, K.X.; Vidavsky, I.; Gross M.L. Comparing similar spectra: from similarity index to spectral contract angle. *J Am Soc Mass Spectrom* 2002, 13, 85-88.

Zimmermann, R.; Rohwer E.R.; Heger, H. "In-line catalytic derivatization method for selective detection of chlorinated aromatics with a hyphenated gas chromatography/laser mass spectrometry technique: A concept for comprehensive detection of isomeric ensembles." *Anal. Chem.* 1999, 71, 4148-4153.

* cited by examiner

METHODS FOR QUANTITATIVE ANALYSIS BY TANDEM MASS SPECTROMETRY

CROSS-REFERENCE TO RELATED APPLICATIONS

This application claims the benefit under 35 U.S.C. §119 of the filing date of U.S. Provisional Application Ser. No. 60/364,436, filed Mar. 15, 2002, which is hereby incorporated by reference.

FIELD OF THE INVENTION

The invention relates to deconvolution of signals from mass spectra of mixtures in tandem mass spectrometry, particularly to a quantitative determination of concentrations of analytes in tandem mass spectrometry.

BACKGROUND OF THE INVENTION

Mass spectrometry, particularly tandem mass spectrometry (MS/MS) is attractive for many applications due to its high selectivity, wide dynamic range, and high throughput capabilities. Analysis of isomers by mass spectrometry usually is complicated by similarity between their mass spectra, and often requires adequate chromatographic separation between compounds in order to eliminate mutual interference. Differentiation of isomers using mass spectrometry is presently achieved through derivatization, choice of collision gas, collision energy, or most commonly in conjunction with chromatographic separation of isomers. Each approach is usually compound specific, such as is described in the following references, all of which are hereby incorporated by reference: Borth, S.; Hansel, W.; Rosner, P.; Junge, T., "Regioisomeric differentiation of 2,3- and 3,4-methylenedioxy ring-substituted phenylalkylamines by gas chromatography/tandem mass spectrometry." J Mass Spectrom. 2000, 35, 705; Vouros, P.; Muller, D. R.; Richter, W. J. "Low-energy collision-induced dissociation of B1-type sugar ions formed from peracetylated methyl pentosides and methyl 6-deoxyhexosides." J. Mass Spectrom. 1999, 34, 346; Sheeley, D. M.; Reinhold, V. N. "Structural Characterization of Carbohydrate Sequence, Linkage, and Branching in a Quadrupole Ion Trap Mass Spectrometer: Neutral Oligosaccharides and N-Linked Glycans." Anal. Chem. 1998, 70, 3053; Zimmermann, R.; Rohwer E. R.; Heger, H. "In-line catalytic derivatization method for selective detection of chlorinated aromatics with a hyphenated gas chromatography/laser mass spectrometry technique: A concept for comprehensive detection of isomeric ensembles." Anal. Chem. 1999, 71, 4148–4153; Seymour, J. L.; Turechek, F. "Distinction and quantitation of leucine-isoleucine isomers and lysine-glutamine isobars by electrospray ionization tandem mass spectrometry (MS n, n 5 2, 3) of copper(II)-diimine complexes." J. Mass Spectrom. 2000, 35, 566–571. It is common that the same mass ion fragments are present among all the isomers. This may create difficulties for analysis of isomers if they are present in a mixture at variable concentrations.

Additionally, structural isomers may be separately analyzed utilizing blackbody infrared radiative dissociation, as described in Schnier, P. D. W., E. R. "Analysis of isomeric mixtures using blackbody infrared radiative dissociation: Determining isomeric purity and obtaining individual tandem mass spectra simultaneously." Anal. Chem 1998, 70, 3033–3041, hereby incorporated by reference; mass-analyzed ion kinetic energy spectroscopy/collision induced dissociation (CID) method, as described, for example, in Krishna, P.; Prabhakar, S.; Vairamani, M. "Differentiation of derivatized leucine and isoleucine by tandem mass spectrometry under liquid secondary ion mass spectral conditions." Rapid Commuin Mass Spectrom. 1998, 12, 1429–1434, hereby incorporated by reference; or compound derivatization followed by low energy CID at conditions preferential for each of the isomers, as described, for example in, Desaire, H. L.; Leary J. A. "Multicomponent quantification of diastereomeric hexosamine monosaccharides using ion trap tandem mass spectrometry." Anal. Chem 1999, 71, 4142–4147, hereby incorporated by reference.

Desaire et al. developed a method for relative quantitation of a mixture of unresolved isomers that is based on the assumption that the total signal of MS/MS transitions is a linear combination of signal intensities of product ions from multiple components. For calculations the method utilizes branching ratios of product ions of pure analytes, assumes equal sensitivity to all the analytes, and normalizes total concentration of all components of a mixture to 100%. Accordingly, the method does not allow obtaining absolute values of concentration and the result of the calculations is presented as percent of total concentration of all isomers present in a mixture.

Bennett et al., "Simultaneous analysis of butene isomer mixtures using process mass spectrometry." J Am Soc. Mass Spectrom. 2000, 11, 1079–85, hereby incorporated by reference, proposed a method for analyzing mixture of isomers utilizing single MS analyzer for process mass spectrometry. The approach can be used to analyze a mixture of isomers within infrequently encountered molecular weight range. Simultaneous quantitation of isomer mixtures in complex samples within commonly encountered range of m/z, like in biological samples, is not feasible with single MS detection because of high potential for interference.

SUMMARY OF THE INVENTION

Embodiments of the present invention provide methods for deconvoluting contributions of a plurality of analytes utilizing a tandem mass spectrometry, or $MS^n$ signal. A tandem mass spectrometry signal including a plurality of peak intensities, generally at one or more mass transitions, is obtained wherein a plurality of analytes in a sample contribute to at least one of said peak intensities. A model is provided relating one or more peak intensities to a contribution intensity for each of said analytes. A contribution intensity for one or more analytes is then calculated using the model. A calibration curve for at least one of the analytes is provided relating contribution intensity to concentration. Based on the calibration curve, a concentration for at least one analyte is determined.

In some embodiments, the model used includes a system of linear equations. In some embodiments, the mass spectrometry signal contains a number of peaks at least equal to the number of the target analytes of interest. In other embodiments, there are a greater number of signal peaks than target analytes, and in other embodiments there are fewer signal peaks than target analytes, and at least one signal peak is monitored at a plurality of collision energies.

In some embodiments, the model includes representing the mass spectrometry signal as a weighted sum of reference signals, each reference signal corresponding to one of said analytes.

Embodiments of the present invention further include performing a quantitative calibration with authentic standards, internal standards, external standards, or a combination of standards may be utilized.

In embodiments of the present invention, the target analytes include isobars, and the quantitative concentration of one or more isobars in a sample can be determined. In some embodiments, the target analytes include isomers.

DETAILED DESCRIPTION OF THE INVENTION

Figure 1A:
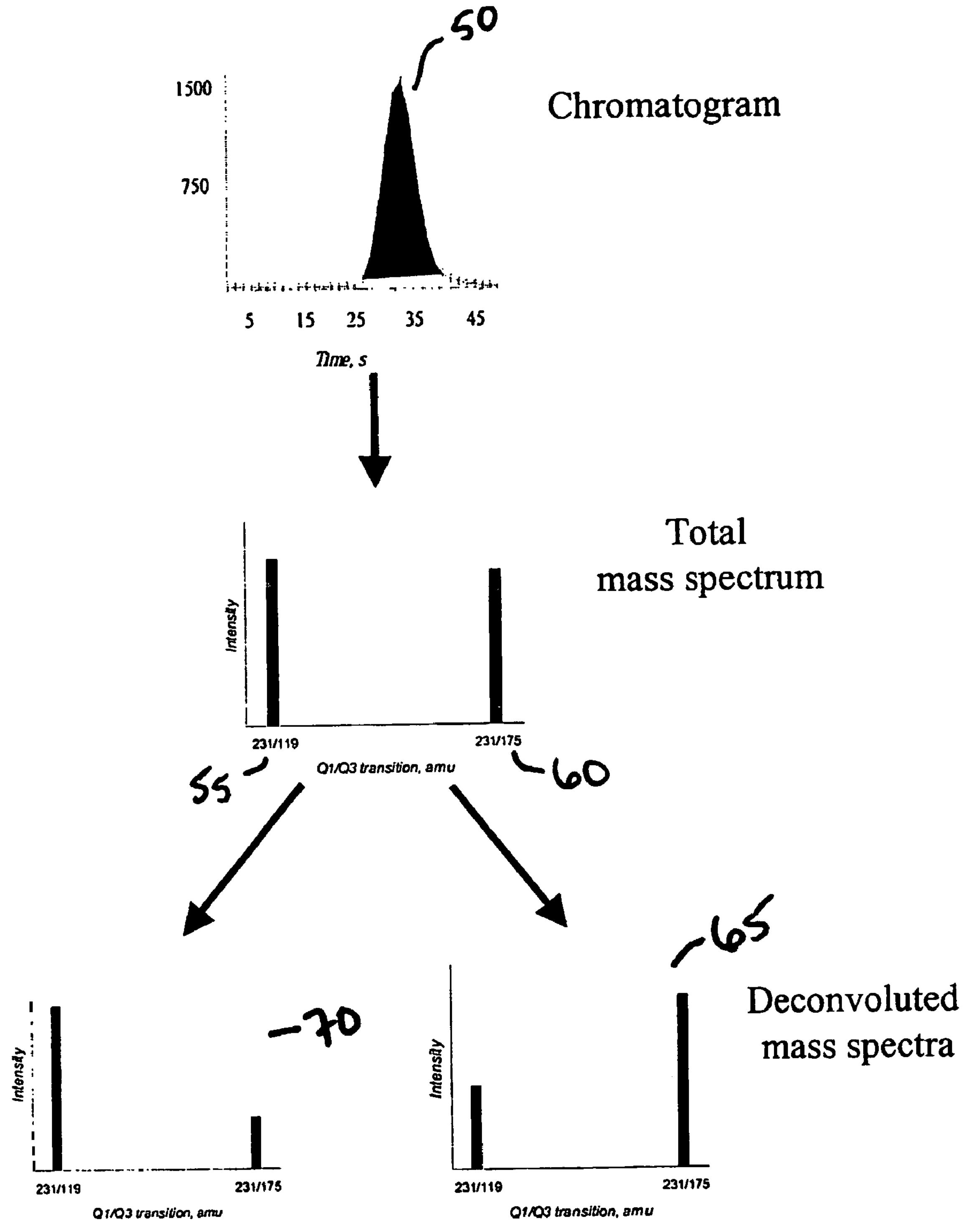
FIG. 1A depicts a general overview of deconvolution of peak intensities from an unresolved chromatographic peak for methylmalonic acid and succinic acid, according to an embodiment of the present invention.

The present invention provides methods for high throughput analysis of analytes in complex mixtures for unresolved chromatographic peaks. Generally, methods are provided for deconvoluting contributions of a plurality of analytes in a sample from a mass spectrometer signal, preferably a tandem mass spectrometry signal. In embodiments of the present invention, quantitative concentrations of analytes, such as, for example, isobars or structural isomers, and in a preferred embodiment, methylmalonic and succinic acids, can be resolved from the chromatographic signal.

Briefly, methods according to the present invention quantify unresolved chromatographic peaks of isomers based on differences in branching ratios of ion intensities in their tandem (or $MS^n$) mass spectra. Without being bound by theory, in preferred embodiments, a mass spectrum of a mixture of isomers or isobars is considered as a linear combination of the MRM spectra of individual constituents. Analytical formulas are used to deconvolute the concentration of individual analytes from total peak intensities for a plurality of analytes, allowing individual contributions to be identified and quantified. In preferred embodiments, two or three analytes may be resolved, although the method also extends to larger numbers of analytes. Using a calibration curve, concentrations of individual constituents can be determined from their intensity contribution.

The mass spectra, or mass spectrometry signal, used to perform the deconvolution, may result from any of a number of MS experiments, or scans, as used herein, including, but not limited to multiple reaction monitoring (MRM), precursor scan, product scan, and constant neutral loss. Briefly, a precursor scan generally refers to a scan taken with a first mass spectrometer (MS1) scanning, and a second (MS2) at a fixed setting so as to select product ions of one m/z value. A product scan generally refers to a scan taken with MS1 at a fixed setting so as to select parent ions of one m/z value and the second MS1 scanning over a range of m/z values. A constant neutral loss scan generally refers to a scan in which MS1 and MS2 are both scanning, but with their m/z settings synchronized at a constant difference. An MRM scan generally refers to an scan in which both mass spectrometers cycle through a set of combinations of m/z values. These combinations are completely arbitrary in the sense that both the parent ion m/z and the daughter ion m/z can take on arbitrary values. Furthermore, the ordering of these values may be arbitrary, for example not necessarily in either an increasing or decreasing order.

In general, methods of the invention proceed as follows. A mass spectrometry (MS) signal, preferably a tandem mass spectrometry signal is obtained. Such an MS signal will exhibit a plurality of signal peaks corresponding to various analytes of interest, such as structural isomers. Each analyte contributes to the intensity of one or more of the peaks. When one or more analytes contributes to any given peak, the precise contribution of each analyte may be determined according to methods of the present invention. Accordingly, a model is provided relating peak intensities to a contribution intensity for each analyte of interest, and that contribution intensity is calculated. By comparing the calculated contribution intensity with a calibration curve, a quantitative concentration for at least one analyte is determined. Calibration curves may be obtained in a variety of ways, as detailed further below.

Some methods for analyzing dicarboxylic acids were described in U.S. application Ser. No. 09/835,845, published as US 2002/0019056 on Feb. 14, 2002, hereby incorporated by reference. The methods for analyzing dicarboxylic acids described therein may advantageously find use in conjunction with the quantitative methods for determining concentrations of isobars, or isomers, described herein.

Accordingly, the present invention provides methods of quantitatively identifying the concentration of a particular analyte, and preferably quantitatively identifying the concentrations of a plurality of analytes, more preferably the concentrations of a plurality of isobars or structural isomers, in a sample of analytes. As will be appreciated by those in the art, the sample itself may comprise a complex mixture, derived from various sources, including, but not limited to, bodily fluids (including, but not limited to, blood, urine, serum, lymph, saliva, anal and vaginal secretions, perspiration and semen; and solid tissues, including liver, spleen, bone marrow, lung, muscle, brain, etc.) of virtually any organism, with mammalian samples being preferred and human samples being particularly preferred); environmental samples (including, but not limited to, air, agricultural, water and soil samples); biological warfare agent samples; research samples (i.e. in the case of nucleic acids, the sample may be the products of an amplification reaction, including both target and signal amplification, such as PCR or SDA amplification reactions); purified samples, such as purified genomic DNA, RNA, proteins, carbohydrates, lipids, etc.; raw samples (bacteria, virus, genomic DNA, proteins, etc.; As will be appreciated by those in the art, virtually any experimental manipulation may have been done on the sample. Particularly, the sample is purified and prepared as appropriate to obtain a mass spectrometry signal, as described further below. Methods for deconvolution described below may be utilized with or without an initial chromatographic separation. That is, samples may be injected without a column, generally referred to as flow-injection analysis. In another embodiment, continuous infusion of a sample is peformed, as known in the art, where sample is fed in to the system at a constant, or non-pulse, rate, for example through the use of a syringe pump.

A quantitative concentration of one or more analytes in the sample are determined according to methods of the present invention. Preferably, analytes of interest in the present invention include isomers or isobars, for example, methylmalonic and succinic acids. Isomers, or structural isomers, generally refer to molecules having identical molecular formulas but different structural formulas. Isobars generally refer to molecules having different molecular formulas but the same nominal molecular weight. Generally, analytes of any molecular weight, both small and large molecules, may be quantified according to methods of the present invention.

One or more mass spectrometry analysis techniques are performed on all or portions of the sample, to generate a mass spectrometry signal. Preferably, tandem mass spectrometry is performed to generate a tandem mass spectrometry signal. Typically, tandem mass spectrometry ($MS^n$) involves the coupled use of two or more stages of mass analysis where both the separation and detection steps are based on mass spectrometry. The first stage is used to select an ion from which further structural information is to be obtained. The usual presumption is that the selected ion corresponds to a component of the sample. This selected ion is then fragmented by collisionally induced dissociation (CID), also known as collisionally activated dissociation (CAD). Other methods of dissociation include, but are not limited to photodissociation and surface induced dissociation. The second stage of mass analysis is then used to detect and measure the mass of the resulting fragments or product ions. A two-stage tandem MS experiment would be called a MS/MS experiment while an n-stage tandem MS experiment would be referred to as a $MS^n$ experiment. Depending on the complexity of the sample and the level of structural detail desired, $MS^n$ experiments at values of n greater than 2 may be performed. In particular, the number of MS stages may generally vary from 2 to 10, more preferably from 2 to 8, still more preferably from 2 to 6, sill further more preferably from 2 to 4, yet preferably from 2 to 3, and most preferably 2 stages are used. Methods of the present invention, however, are also applicable to mass spectrometry signals generated through other techniques, including, but not limited to, four sector mass spectrometers, TOF-TOF, ion trap, q-TOF hybrids, sector/quadrupole hybrids, ion cyclotron resonance, and others as known in the art.

As known in the art, any of a variety of mass spectrometers may be used to generate the mass spectrometry signal, or tandem mass spectrometry signal. Triple quadrupole tandem mass spectrometers are particularly well suited for such experiments. The first and third quadrupoles serve as mass filters while the second quadrupole serves as a collision cell for CID. Triple quadrupoles are generally better adapted to MRM than most other tandem mass spectrometers when relatively few transitions are involved. When many MS/MS transitions are involved a Q-TOF has a sensitivity advantage and would be then preferable. Another common platform on which tandem mass spectrometry is performed is ion trap mass spectrometer. In ion trap analyzer multiple stage mass spectra are taking place temporally rather than spatially separated. In a ion trap based mass spectrometer, parent ion selection and dissociation take place in the same part of the vacuum chamber and are effected by control of the radio frequency wavelengths applied to the trapping elements and the collision gas pressure. Hence, while a triple quadrupole mass analyzer is limited to two stages of mass spectrometry (i.e. MS/MS), ion trap-based mass spectrometers can perform $MS^n$ analysis in which the parent ion is isolated, dissociated, mass analyzed and a fragment ion of interest is isolated, further dissociated, and mass analyzed and so on.

This method may include an extraction where one or more analytes is extracted from the sample matrix prior to the MS analysis. The extraction may be conducted in a number of conventional ways not limited to the discussed types. For example, the extraction may be of solid phase type in which the component of the sample is adsorbed onto a solid phase and then eluted from the adsorbent. Solid phase microextraction may be also used in which the component is adsorbed onto a fiber, and then eluted. Alternatively, the extraction may be a liquid-liquid extraction in which the compound is partitioned in an organic solvent which is then separated from the remainder of the sample. Briefly, the liquid-liquid extraction step involves agitation of sample with an extraction solvent, then the sample is centrifuged, and one of the layers, typically the organic layer, is retained for analysis. Prior to preceding with the MS analysis the sample may be derivatized in order to enhance detection specificity and sensitivity. There is no limitation to the type of derivative used in the present method. The most suitable would be derivative that allow efficient ionization of compound of interest and demonstrate sufficient differentiation in fragmentation of isobars (or isomers) of interest. In the preferred embodiment of the invention the n-butyl ester is particularly well suited to the determination of methylmalonic acid in biological samples.

Following derivatization the sample may be treated in one or a variety of ways, for example, by filtration, prior to the MS analysis or chromatographic separation is utilized for separation of compounds of interest from the coeluting peaks. Such filtration and chromatographic separation may be performed by methods well known in the art.

Various ionization techniques may be utilized for compound ionization prior to mass spectrometry fragmentation. The ionization may be performed but not limited to atmospheric pressure ionization (API). API techniques include but not limited to electrospray ionization, nebulizer assisted electrospray, atmospheric pressure chemical ionization (APCI), atmospheric pressure photoionization (APPI). Other methods of ionization include, but are not limited to, electron impact ionization, particle beam ionization, matrix assisted laser desorbtion ionization (MALDI), SELDI, or other ionization techniques.

Various mass spectrometry types of experiments may be utilized for the data collection including, but not limited to, multiple reaction monitoring, product ion scan, precursor ion scan, neutral loss modes of operation.

In general, further information on methods, apparatus, and techniques for generating a tandem mass spectrometry signal can be found in, for example, K. L. Busch, G. L. Glish, and S. A. McLuckey. Mass Spectrometry/Mass Spectrometry Techniques And Application Of Tandem Mass Spectrometry. VCH Publishers, Inc., 1988, and R. Willoughby, E. Sheehan, S Mitrovich. A Global View of LC/MS. Chem-Space Associates, Inc. 2-nd edition. 2002, both of which are hereby incorporated by reference.

Further, other mass spectrometry techniques may be used as known in the art and generally described, for example, in Todd, Journal of Pure Applied Chemistry, 1991, 63, 1541–1566, Standard Definitions of Terms Relating to Mass Spectrometry, 1991, 2, 336–346, and O. D. Sparkman. Mass Spec Desk Reference, Global View Publishing, Pittsburgh, 2000, all of which are hereby incorporated by reference.

Typical applications of $MS^n$ often involve analyzing mixture components with unique product ions where each mass ion derives only from one component. When similarly fragmenting analytes are present in a mixture it is common practice to chromatographically separate the peaks. For such application when isobars (or isomers) are present in a mixture and not resolved chromatographically quantitative results of analysis may be compromised, accordingly, methods according to the present invention would be particularly advantageous. In an embodiment of the present invention present invention when analytes in a mixture produce overlapping signals in a product ion mass spectrum, the absolute concentration of one or more analytes can be determined without chromatographic separation, as described further below.

Product ion mass spectra of isomers often have characteristic mass ion fragments having identical masses. In some of the cases it is possible to identify conditions that would lead to distinctive fragmentation of isomers. Generally, when such conditions exist, relative intensity of product ions and their ratio would be different among the isomers. Such difference in relative intensity between the compounds form a basis for methods of isomers analysis according to a preferred embodiment of the present invention.

Accordingly, a mass spectrometry signal representing a plurality of peak intensities is obtained. Generally, each peak intensity corresponds to a particular mass transition (parent ion to product ion mass/charge ratio, m/z), representing a fragmentation of an ion to smaller fragments. Further, a plurality of analytes of interest, such as a plurality of structural isomers, for example, contribute signal to one or more of the peak intensities. That is, one or more of the peak intensities in the obtained signal is derived from a plurality of analytes, such as a plurality of structural isomers.

Methods according to the present invention proceed by providing a model that relates one or more of the peak intensities in the tandem mass spectrometry signal, described above, to a contribution intensity for each of a plurality of analytes of interest. When multiple analytes are present in a mixture, the product of the molecular ion usually consists of combination of mass ions originated from all the analytes. Under an assumption that product ion mass spectral signal amplitude is proportional to concentration, mass spectra of a mixture can be approximated as linear combinations of the characteristic mass transitions corresponding to the contributing pure components, and using notations similar presented by Bennett et al., "Simultaneous analysis of butene isomer mixtures using process mass spectrometry." J Am Soc. Mass Spectrom.2000, 11, 1079–85, hereby incorporated by reference, can be represented as a function $$X=f(R_s,S,C)$$

where X is a spectrum of an unknown mixture; $R_s$ represents the pure component reference spectra; S are the relative sensitivities; and C are the concentrations at which components are present. In practice, Rs are determined from acquired spectra of pure components; S are determined using a calibration mixture of known composition. This information can be used to determine C from measured mass spectra of unknown (X). To compensate for drift in absolute intensities in quantitative analysis ion intensities can be normalized to intensity of an internal standard.

Without being bound by theory, preferred embodiments of the present invention are advantageously performed in conditions where: (i) no peaks other than isomers producing the same mass transitions are present under the target peak, (ii) total acquired signal is a linear combination of signals from the coeluting isomers; and (iii) branching ratio of the monitored mass transitions is significantly different among the isomers and the reference spectra are linearly independent. Further, in preferred embodiments, the mass spectrometer provides adequate precision and accurate acquisition of signal intensity for the utilized mass transitions. Alternatively the same transitions can be monitored at different collision energies and the corresponding intensities can be used for the deconvolution. The problem may be solved by variety of mathematical methods including, but not limited to, as a system of linear equations, or as a vector- or matrix-based model.

In one embodiment, the model comprises a system of linear equations. Such a system is appropriate and finds a solution when the signal contains at least one peak intensity level for each of said target analytes. That is, if two analytes of interest are present in the sample, at least two mass transitions are available to conduct the following analysis.

In one embodiment, the system of linear equations is as follows:

$$I_A=I_{a1}+I_{a2}+ \ldots +I_{ai}$$

$$I_B = I_{b1} + I_{b2} + \ldots + I_{bi}$$

$$I_j = I_{j1} + I_{j2} + \ldots + I_{ji}$$

$$A_i = \frac{I_{ai}}{I_{bi}}$$

$$B_i = \frac{I_{bi}}{I_{ji}}$$

$$J_i = \frac{I_{ai}}{I_{ji}}$$

where $I_A$, $I_B$, $I_C$ are total intensities of signal from the utilized mass transitions; $I_{ai}$, $I_{bi}$, $I_{ji}$ are intensity of signal from individual analytes; $A_i$, $B_i$, $J_i$ are branching ratios for the mass transitions of pure analytes.

The system of equations above generally has solution when number of equations is equal to the number of unknowns. Accordingly, the number of the product ions that needs to be utilized for each compound is equal to the number of potentially coeluting isomers. This means that for two coeluting peaks two transitions should be monitored for each analyte and a system of 4 equations should be solved; for n coeluting peaks n transitions should be monitored for each compound, and a system of $n^2$ equations should be solved. In one embodiment, when two coeluting peaks are present, and two ion transitions are monitored for each compound, solution for the system would be:

$$I_{a1} = \frac{(-B \cdot I_a + I_b)}{(A - B)} \quad (6)$$

$$I_{b1} = A \cdot \frac{(-B \cdot I_a + I_b)}{(A - B)}$$

$$I_{a2} = \frac{(A \cdot I_a - I_b)}{(A - B)}$$

$$I_{b2} = B \cdot \frac{(A \cdot I_a - I_b)}{(A - B)}$$

In another embodiment, when three peaks are coelute three ion transitions should be monitored for each compound, the system would have solution:

$$I_{a1} = -\frac{(B_1 \cdot I_C - C_1 \cdot I_C + C_1 \cdot B_2 \cdot I_A - B_2 \cdot I_B + C_2 \cdot I_B - B_1 \cdot C_2 \cdot I_A)}{(-B_1 \cdot A_2 + C_1 \cdot A_2 - C_1 \cdot B_2 + A_1 \cdot B_2 - A_1 \cdot C_2 + B_1 \cdot C_2)}$$

$$I_{b1} = -A_1 \cdot \frac{(B_1 \cdot I_C - C_1 \cdot I_C + C_1 \cdot B_2 \cdot I_A - B_2 \cdot I_B + C_2 \cdot I_B - B_1 \cdot C_2 \cdot I_A)}{(-B_1 \cdot A_2 + C_1 \cdot A_2 - C_1 \cdot B_2 + A_1 \cdot B_2 - A_1 \cdot C_2 + B_1 \cdot C_2)}$$

$$I_{c1} = -A_2 \cdot \frac{(B_1 \cdot I_C - C_1 \cdot I_C + C_1 \cdot B_2 \cdot I_A - B_2 \cdot I_B + C_2 \cdot I_B - B_1 \cdot C_2 \cdot I_A)}{(-B_1 \cdot A_2 + C_1 \cdot A_2 - C_1 \cdot B_2 + A_1 \cdot B_2 - A_1 \cdot C_2 + B_1 \cdot C_2)}$$

$$I_{a2} = \frac{(-C_1 \cdot I_C + A_1 \cdot I_C + A_2 \cdot C_1 \cdot I_A - A_2 \cdot I_B - A_1 \cdot C_2 \cdot I_A + C_2 \cdot I_B)}{(-B_1 \cdot A_2 + C_1 \cdot A_2 - C_1 \cdot B_2 + A_1 \cdot B_2 - A_1 \cdot C_2 + B_1 \cdot C_2)}$$

$$I_{b2} = B_1 \cdot \frac{(-C_1 \cdot I_C + A_1 \cdot I_C + A_2 \cdot C_1 \cdot I_A - A_2 \cdot I_B - A_1 \cdot C_2 \cdot I_A + C_2 \cdot I_B)}{(-B_1 \cdot A_2 + C_1 \cdot A_2 - C_1 \cdot B_2 + A_1 \cdot B_2 - A_1 \cdot C_2 + B_1 \cdot C_2)}$$

$$I_{c2} = B_2 \cdot \frac{(-C_1 \cdot I_C + A_1 \cdot I_C + A_2 \cdot C_1 \cdot I_A - A_2 \cdot I_B - A_1 \cdot C_2 \cdot I_A + C_2 \cdot I_B)}{(-B_1 \cdot A_2 + C_1 \cdot A_2 - C_1 \cdot B_2 + A_1 \cdot B_2 - A_1 \cdot C_2 + B_1 \cdot C_2)}$$

$$I_{a3} = \frac{(-B_2 \cdot I_B + A_1 \cdot B_2 \cdot I_A + A_2 \cdot I_B - A_1 \cdot I_C - B_1 \cdot A_2 \cdot I_A + B_1 \cdot I_C)}{(-B_1 \cdot A_2 + C_1 \cdot A_2 - C_1 \cdot B_2 + A_1 \cdot B_2 - A_1 \cdot C_2 + B_1 \cdot C_2)}$$

$$I_{b3} = C_1 \cdot \frac{(-B_2 \cdot I_B + A_1 \cdot B_2 \cdot I_A + A_2 \cdot I_B - A_1 \cdot I_C - B_1 \cdot A_2 \cdot I_A + B_1 \cdot I_C)}{(-B_1 \cdot A_2 + C_1 \cdot A_2 - C_1 \cdot B_2 + A_1 \cdot B_2 - A_1 \cdot C_2 + B_1 \cdot C_2)}$$

$$I_{c3} = C_2 \cdot \frac{(-B_2 \cdot I_B + A_1 \cdot B_2 \cdot I_A + A_2 \cdot I_B - A_1 \cdot I_C - B_1 \cdot A_2 \cdot I_A + B_1 \cdot I_C)}{(-B_1 \cdot A_2 + C_1 \cdot A_2 - C_1 \cdot B_2 + A_1 \cdot B_2 - A_1 \cdot C_2 + B_1 \cdot C_2)}$$

The equations allow to calculate intensity of the coeluting peaks based on the available information of total signal and branching ratios for the pure analytes. Utilizing analogous approach it is possible to find solution for a system consisting of larger number of coeluting peaks.

According to other embodiments of the present invention, a vector- or matrix-based model is provided, where the mass spectrometry signal is generally represented as a weighted sum of reference signals, each reference signal corresponding to one of the analytes, or isomers, of interest. In one embodiment, the system can be presented as a set of reference spectra Rj for the j components of the mixture, where Rj is a vector. In a preferred embodiment, each vector is normalized to unit probability, and the sum of its elements is equal to one. As appreciated by those in the art, other normalization methods and schemes may also be used. Further, in a preferred embodiment, each element of the vector is equal to or greater than zero, since negative intensities have no meaning in mass spectrometry. Again, in other embodiments other positive/negative schemes may be adopted. Accordingly, in a preferred embodiment the experimental spectrum (X) can be represented as a sum of the Rj.

$$X = \sum_j a_j R_j$$

The deconvolution process consists of calculating the appropriate weighting coefficients, $a_j$, to provide the best fit to X with constraint, in one embodiment, for the aj to be non-negative. There are two cases to consider. In a first case the number of compounds equals the number of peaks in each reference spectrum. This is a generalization of the approach described above but may advantageously be more easily extended to systems containing more than two components. In a preferred embodiment, the Rj must be not only unique, but also linearly independent. In this embodiment an exact solution for the problem is possible. Multiple strategies are possible for determining the coefficients. In one embodiment, each Rj is expressed as a column vector. Each vector Rj is stacked horizontally to form a matrix, R. The elements of this matrix are intensities, which we symbolize by Rij, where "j" identifies the analyte and "i" identifes an MS/MS transition. The values for the Rij matrix elements are preferably obtained from experimental measurements of authentic reference standards analyzed in the same batch with the samples, though any source of reliable values may serve the purpose, for example, spectral libraries. The experimental spectrum, X, is a column vector whose ith element is the intensity of the ith mass transition in the experimental spectrum, and the values of vector are elements of the matrix "aj". The experimental spectrum (X) can now be re-written as $$X = R \cdot a$$

The solution to this vector equation is $$a = R^{-1} \cdot X$$

When the number of used ion mass transitions exceeds the number of components then the system is over determined and generally has no exact solution. However, in one embodiment, the coefficients (aj) can be found by minimizing the distance between the optimized result and the experimental values. In this case R is no longer a square matrix, and, in a preferred embodiment a new vector is defined $$Y = R \cdot a$$

and a residual representing the error between the trial solution and the experimental result should be evaluated $$Z = X - Y$$

In a preferred embodiment, a least squares fit is performed, which corresponds to minimizing the difference according to the formula $$\partial(Z^T \cdot Z)/\partial a_j = 0, \text{ for all } a_j$$

where $Z^T$ is the transpose of the matrix Z.

The deconvoluted values, aj allow the determination of relative amount of the components in the mixture. In order to determine absolute concentration of the components quantitative calibration is performed with standards of known concentration, and a calibration curve relating the a-factors to concentration is generated. Calibration may be performed with utilizing authentic standards, internal or external standards. Somewhat equivalently, one could use the deconvoluted intensities of one of the MS/MS transitions to prepare the calibration curves. In one embodiment, separate solutions of pure compounds could be used to prepare the calibration curves. In another embodiment, calibration curves (or equations) are generated using internal standards and relate ratio of concentration of analyte to concentration of the internal standard on one axis of the calibration graph, or curve, and intensity of the peaks of the analyte and the internal standard on the other axis of the calibration graph. In other embodiments, the calibration solutions may be mixtures, in which case the intensity of mass transitions or a-factors must be obtained by the deconvolution procedure outlined above. In embodiments where a sample matrix produces intensity at the target peaks, the sample matrix may be defined as one of the components of the mixture. The deconvolution procedure will then remove the sample matrix contribution. The term "sample matrix" here denotes a particular sample, or arrangement of sample described further above, and is not to be confused with the use of the term "matrix" to describe a mathematical technique, also described above.

Accordingly, and with reference to FIG. 1A, embodiments of methods according to the present invention described above generally proceed as follows—intensities for each mass transition of interest are summed over a selected chromatographic peak, such as peak 50, to generate a signal corresponding to total intensity for each transition, such as transitions 55 and 60. The intensities are deconvoluted into intensities of individual analytes, as seen in graphs 65 and 70, based on branching ratios acquired form the authentic standards, and comparison to a calibration curve is performed to obtain a quantitative concentration measurement of a particular analyte in a sample.

In embodiments described above, the number of peaks, or mass/ion transitions monitored equals or exceeds the number of analytes of interest. The term mass transition normally refers to a specific parent/product ion m/z combination. However, in some embodiments of the present invention, rather than monitor different mass transitions, a single mass transition may be monitored at a plurality of collision energies. For example, if two analytes of interest may be in a sample, two mass transitions are monitored in one embodiment, while a single mass transition is monitored at two collision energies in another embodiment. This may be extended to greater numbers of analytes—for example, if three analytes of interest are in a sample, three mass transitions are monitored in one embodiment, while a single mass transition is monitored at three collision energies in another embodiment. In yet another embodiment with three analytes of interest in a sample, a first mass transition is monitored at a first collision energy, and a second mass transition is monitored at two collision energies. In this manner, the techniques and embodiments may be applied to greater than three analytes, using single or multiple mass transitions alone or in combination with one or more collision energies for which one or more mass transitions are monitored. Accordingly, as used herein, the term "mass transition", or multiple mass transitions, is used to refer to either different mass transitions, the same mass transition acquired at different collision energies, or some combination of the above.

In some embodiments, the number of mass transitions monitored, and/or the number of collision energies monitored exceeds the number of analytes of interest. This generally may result in an overdetermined system, and the additional information may be used to confirm compound identity, verify the results of the experiment or increase the degree of certainty of the quantitative output.

Figure 1B:
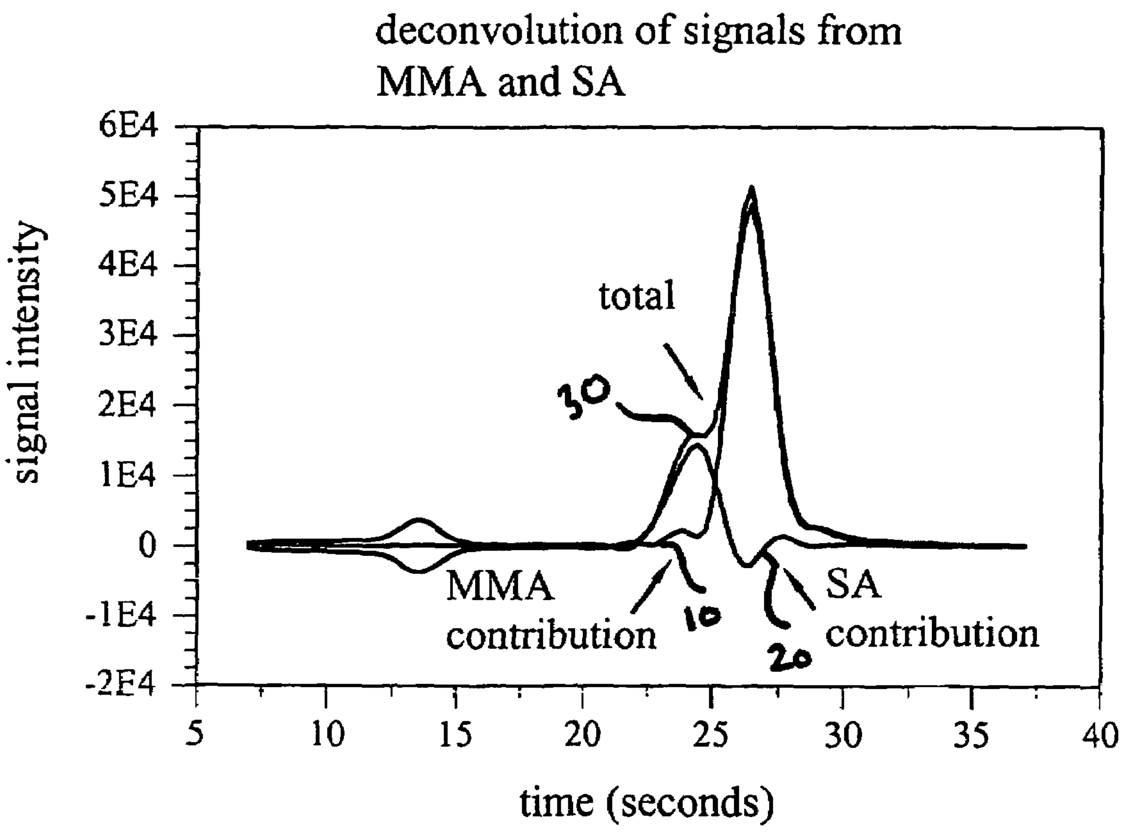
FIG. 1B depicts a deconvoloted m/z 119 daughter ion into contributions from methylmalonic and succinic acids, according to an embodiment of the present invention utilizing point-by-point deconvolution.

In another embodiment, a point-by-point deconvolution, or "scan-by-scan deconvolution" of mass spectrometry data is performed, preferably LC-MS/MS data. In these embodiments, spectral signals are deconvoluted on a point-by-point, or scan-by-scan basis. That is, instead of performing the above methods on a summed spectra, they may be performed on a individual scans or points. Chromatograms of deconvoluted results are produced and integrated, and a calibration is performed as described above to achieve quantitative measurements. For example, FIG. 1B depicts a deconvoloted m/z 119 daughter ion into contributions from MMA 10 and SA 20. The chromatograms of the MMA contribution and SA contribution are shown, along with the chromatogram for the unresolved peaks 30 (only one of the two MS/MS transitions of the mixture is shown here for ease of illustration).

In embodiments using a scanning mass spectrometer, the time values for each different MS/MS transition are different. For example, the m/z 231→119 transition is on a set of time increments that is offset compared to the m/z 231→175 transition. A triple quadrupole mass spectrometer is a typical scanning instrument. In a preferred embodiment, new data sets are built, interpolating points from the raw data so that both data sets are placed on the same time increments. However, as known in the art, some mass spectrometers do not require this interpolation procedure.

Methods according to the present invention find use in a variety of fields, in particular the analysis of structural isomers in a mixture, and quantification of their individual concentrations. For example, analysis of isomeric dicarboxylic acids methylmalonic acid (MMA) and succinic acid (SA) is provided. MMA is a metabolic intermediate in the conversion of propionic acid to SA, which is a marker of two severe clinical disorders: vitamin B12 deficiency and methylmalonic acidemia. SA is the final product of the same metabolic pathway as MMA, which is present in sample at 10–50 fold greater concentrations compared to MMA. To be practically useful, a test for MMA should be able to distinguish MMA in presence of large excess of SA. The method for analysis of MMA and SA utilizes electrospray ionization (ESI), singly charged cations and low energy CAD with monitoring two most unique product ions. Each isomeric compound gives a distinctive product-ion spectrum (FIGS. 2*c* and *d*), which can be utilized by the above-described methods.

The above-described methods for quantitation of unresolved chromatographic peaks can be applied to high throughput analysis of any isomers with substantial difference in characteristic product ions. Potential applications could range from analysis of isomers of small molecules to analysis of isomeric peptides and analysis of chiral compounds. In addition to the application of the approach to isomer analysis the method is applicable to analysis of any mixture of isobaric ions, regardless of their chemical composition.

EXAMPLES

Reagents

Isomers methylmalonic (MMA) and succinic acids (SA), were purchased from Sigma Chemical Co., and $d_3$-MMA was purchased from Cambridge Isotope Laboratories. Methanol, acetonitrile, methyl-tert-butyl ether (MTBE), and phosphoric acid were all HPLC grade from Fisher Scientific. Hydrochloric acid (3 mol/L) in n-butanol was purchased from Regis Technologies, Inc. All other chemicals were of the highest purity commercially available.

Apparatus

A PE series 200 HPLC system (Perkin Elmer Analytical Instruments) was equipped with a Luna C18 column 30 mm×3.0 mm, 3 μm particles (Phenomenex). The mobile phase consisted of 85% methanol and 15% 0.005M ammonium formate buffer, pH 6.5. The mobile phase flow rate was 750 μL/min and the LC column effluent split flow was 500–600 μL/min. The column temperature was 40° C., the injection volume was 3 μL, and the injection interval was 60 s. An API 2000 (Applied Biosystems/MDS SCIEX) tandem mass spectrometer was used in the positive ion mode with TurbolonSpray™ (TIS) interface. Quantitative analysis was performed in the MRM mode. The collision gas was nitrogen with a cell pressure of 1.1 Pascal. The TIS capillary voltage was 6.0 kV, the orifice voltage was 8 V, and the collision energy was 15 V. The MRM transitions monitored were FT/z. 231→119 and 231→175 for MMA and SA, and 234→122, and 234→178 for $d_3$-MMA. peaks integration was performed with TurboQuan™ (Applied Biosystems/MDS SCIEX) software. All the calculations for deconvolution of the isomers concentration from the total peak intensities were processed using an Excel spreadsheet.

ESI/MS/MS Experiments

The n-butyl esters of organic acids for qualitative mass spectral measurements were prepared by transferring 400 nmol of each acid into glass tubes. The solvent was evaporated and the residue reconstituted with 40 µL of n-butanol containing 3M HCl. The tubes were incubated at 60° C. for 15 minutes. Excess derivatizing reagent was evaporated and the remaining residue was reconstituted with 4 mL of methanol containing 5% of 0.005M ammonium formate, pH 6.5. For both MS and MS/MS experiments ion source and analyzer conditions were the same as utilized for the MMA n-butyl ester derivative. The samples were infused by syringe at a flow rate of 5 µL/min into the TIS ion source.

Assay Procedures

Preparation of calibrators, controls, and standards. Dialyzed plasma was prepared from a pool of human plasma, and showed no detectable levels of MMA and SA. Assay quantitative calibration was performed by analyzing standards containing MMA spiked in dialyzed human plasma at concentrations of 0.2, 0.5, 0.75, 1.0, 1.5, and 2 µmol/L. Branching ratios for MMA was determined as an average of the values observed in the calibration standards processed with each set of samples. Along with establishing a calibration curve, the standards were utilized to determine the branching ratio m/z 231→175/231→119 for MMA. A branching ratio for the same transition of SA, m/z 231→175/231→119, was established from injection of a standard containing 100 µmol/L of SA. Quality controls to determine batch acceptability were prepared containing known concentrations of analytes in different proportions.

Sample Preparation

Samples were aliquoted into disposable glass tubes (1 mL for serum/plasma analysis, and for urine analysis 0.1 mL of sample and 0.9 mL of water). To this, 100 µL of the working internal standard solution, and 3 mL of MTBE containing 3% phosphoric acid were added, and the tubes were vortexed for 5 minutes and centrifuged at 3000 g for 10 minutes. The supernatant was transferred to a second set of tubes, the solvent was evaporated, and 40 µL of n-butanol with 3M HCl was added. The mixture was incubated at 50° C. for 5 minutes. The excess derivatizing reagent was evaporated, the residues reconstituted with 75 µL of the mix of 50% methanol and 50% 0.005M ammonium formate and transferred to autosampler vials.

Patient Sample Comparison Study

A group of 270 serum, plasma and urine human samples with concentrations of MMA ranging from 0.1 to 180 µmol/L and SA from 4 to 20 µmol/L were analyzed by the evaluated method and by a comparative LC-MS/MS method that utilized chromatographic separation of MMA and SA. Sample preparation utilized for the comparative method was the same as for the evaluated method. LC analysis was performed utilizing the same LC column with the mobile phase consisting of 70% methanol and 30% of 0.005 M ammonium formate buffer pH 6.5. To account for bias in both the reference and the evaluated methods, the results were analyzed by Deming regression, as described, for example in Cornbleet, et. al. "Incorrect least-squares regression coefficients in method-comparison analysis" *Clin. Chem.* 1979 25: 432–8, hereby incorporated by reference.

Mass Spectra Similarity

Simultaneous analysis of isomers with the proposed algorithm relies on measurements of small spectral differences, accordingly, in one embodiment, a determination is made as to how small the difference can be before quantitation becomes compromised. To assess the similarity of various spectral subsets in order to distinguish between compounds with similar spectra it is common to use similarity indexes (SI). See, for example, Wan, K. X.; Vidavsky, I.; Gross M. L. Comparing similar spectra: from similarity index to spectral contrast angle. J Am Soc Mass Spectrom 2002, 13, 85–88, hereby incorporated by reference. Product-ion spectra can be compared by spectral contrast angles (CA), a type of SI. In CA, each spectrum is represented as a vector in an N-dimensional space. See Wan, et. al. The contrast angle can be considered to be a type of similarity index. The similarity is usually expressed as an angle between the vectors. Contrast angle is calculated according to formula $$\cos\theta = \frac{\sum_{1}^{n} a_i b_i}{\sqrt{\sum_{1}^{n} a_i^2 \cdot \sum_{1}^{n} b_i^2}}$$

where θ is contrast angle, $a_i$ and $b_i$ are intensity of the product ions. Spectra that resemble each other have vectors that point in the same direction in the space and have angle between vectors of zero degrees. A 90° angle indicates the greatest spectral difference. The spectral contrast angle is especially effective when analytes fragment similarly to each other and it is necessary to distinguish the compounds based on small differences. Accordingly, methods of the present invention may advantageously make use of similarity indices, such as contrast angle. Other similarity indices may also be used, as known in the art.

The methods described above are preferably implemented in conditions where the instrument can consistently distinguish mass spectra of the isomers. Contrast angle values have been evaluated as a measure of instruments ability to distinguish isomers, n-butyl esters of MMA and SA. Contrast angle was calculated for two product ion spectra between isomers MMA and SA, and for multiple acquisitions of the same isomer self-CA (MMA versus MMA, and SA versus SA). The results of measurement are presented in Table 1. Each spectrum was measured eight times using the same experimental conditions and observed values of CA were compared to each other. Because the spectral contrast angle values are significantly higher then the self-measurements, the product-ion spectra of isomers are judged to be significantly different.

TABLE 1

Calculated values of contrast angle for isomers MMA and SA and self-contrast angle for multiple acquisitions of the same compound and imprecision of repetitive measurements (n = 8).

| | | Imprecision, % | | |
|---|---|---|---|---|
| Compared | Contrast angle, θ | Within-run | Between-run | Total |
| MMA versus SA | 40.3 | 2.9 | 3.3 | 4.4 |
| MMA versus MMA | 2.07 | 0.05 | 0.07 | 0.09 |
| SA versus SA | 1.01 | 0.017 | 0.017 | 0.024 |

The methods described above are influenced by the accuracy of measurements of acquired signal and whether or not that observed reference signal result only from one of the target analytes. Because the fragmentation may not be fully reproducible between instruments and on different days on the same instrument, in preferred embodiments, it is preferable to acquire values of branching ratios for pure standard within the same run as the analysis of unknown samples. When comparing two compounds, the differences between the spectra SI should be significantly greater than self-SI.

Fragmentation of MMA and SA Diesters

Figure 2:
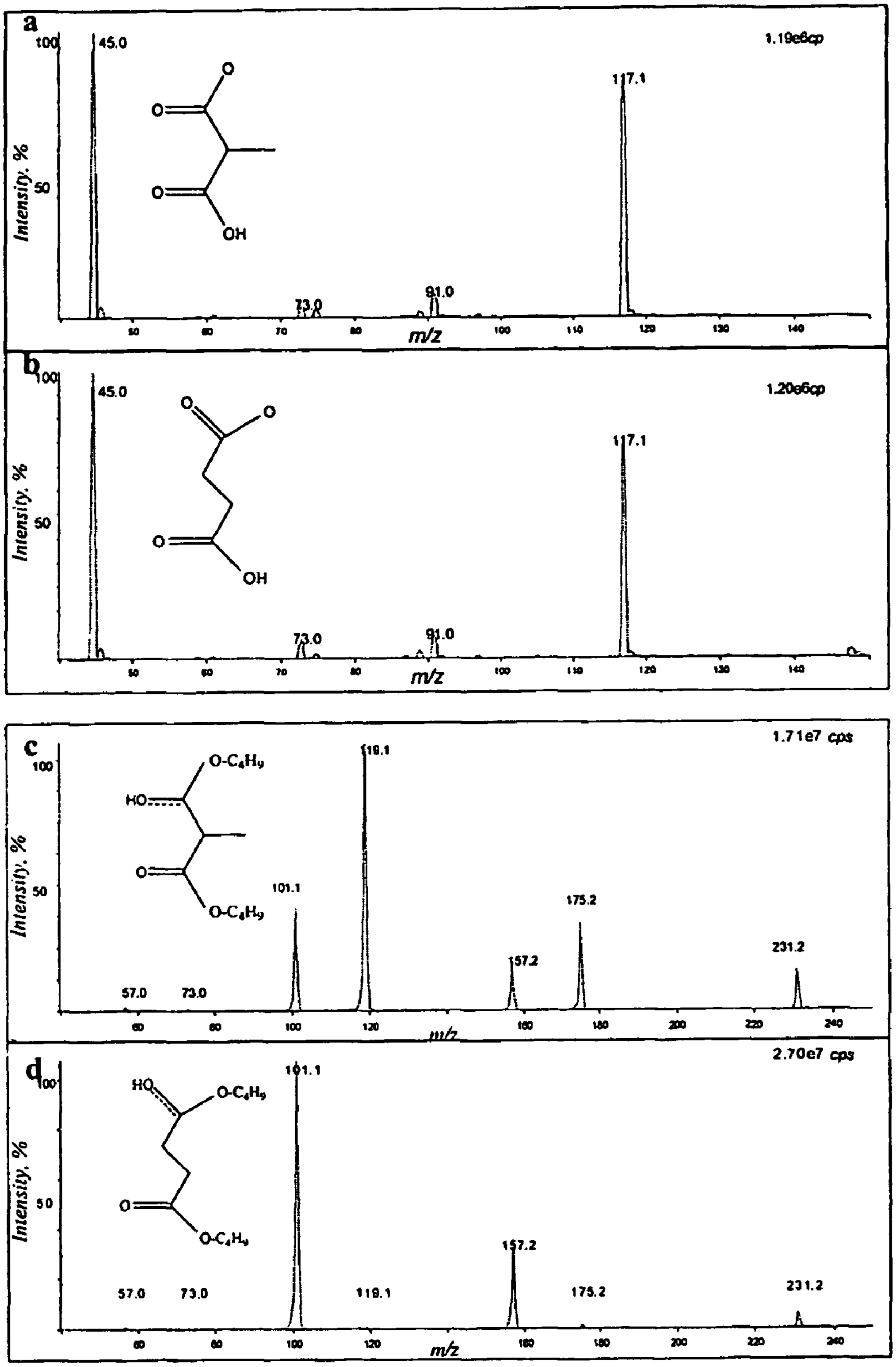
FIGS. 2A–2D depict product-ion spectra of isomers, according to an embodiment of the present invention.
Figure 3:
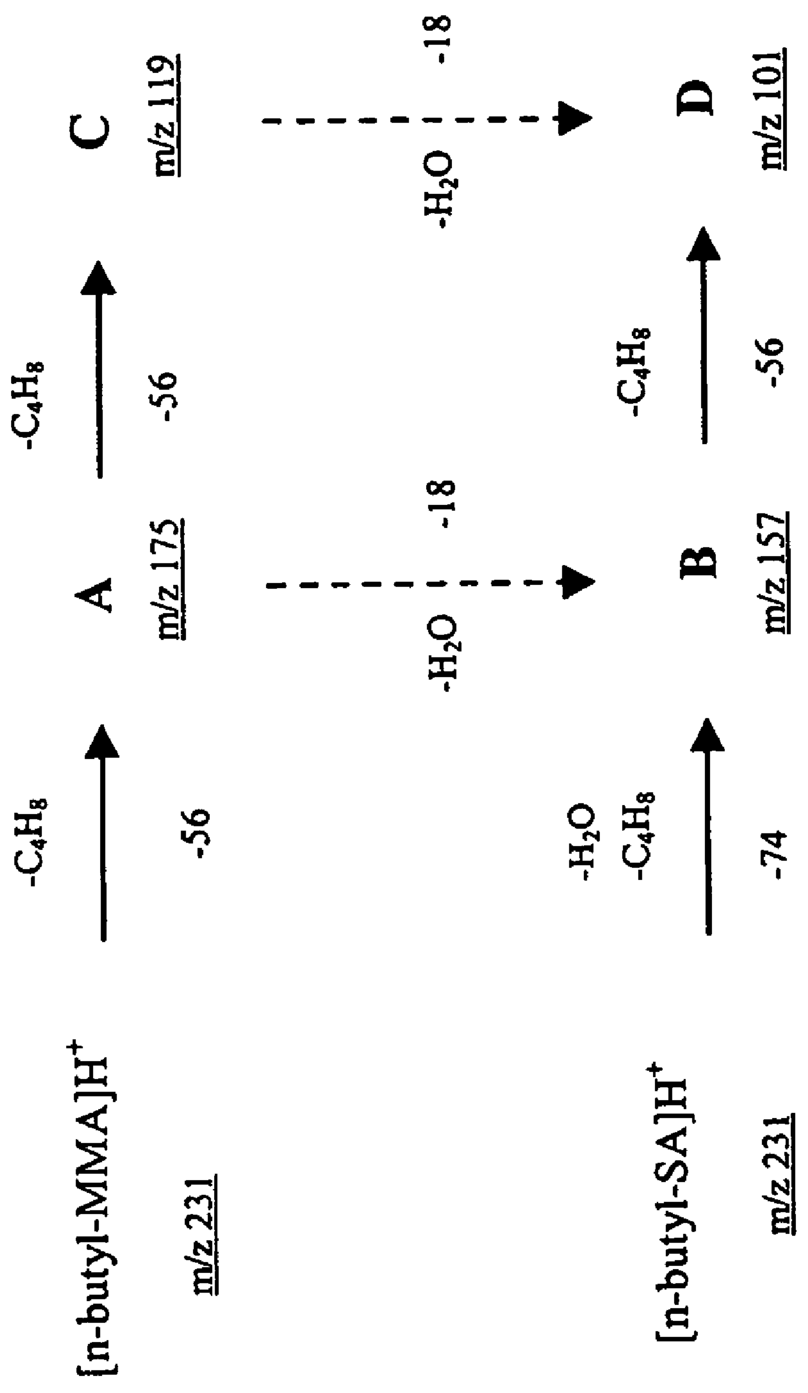
FIG. 3 depicts some major product ions observed by the ESI-MS/MS of dicarboxylic acid dibutyl ester [M+1]+ as the precursor ion, according to an embodiment of the present invention.

Organic acids are readily detected in the negative ion mode as anions utilizing atmospheric pressure ionization, as described, for example, in Mills, G. A.; Walker, V.; Cleanch, M. R.; Parr, V. C. Analysis of urinary organic acids by plasmaspray liquid chromatography/mass spectrometry. Biomed Environ Mass Spectrom 1988, 16, 259–61; Buchanan, N. B.; Munzer, J.; Thoene, J. G. Positive-ion thermospray liquid chromatography-mass spectrometry: detection of organic acidurias. J Chromatogr B 1990, 534, 1–11; and Kajia, M.; Niwa, T.; Watanabe, K. Analysis of urinary organic acids by liquid chromatography-atmospheric pressure chemical ionization mass spectrometry. J Chromatogr B 1993, 622, 263–268, hereby incorporated by reference. In the negative ion mode the structural isomers MMA and SA are indistinguishable from each other (FIGS. 2A and 2B). In contrast to other carboxylic acids esters dicarboxylic acid di-esters produce positively charged molecular ions. Accordingly, the present method is selective to dicarboxylic acids, and has the ability to differentiate MMA from SA, potential endogenous interference present in biological samples at greater concentration. A study of the collisionally induced dissociation fragmentation mechanism for various dicarboxylic acids revealed that MS/MS fragment ions m/z 175 and 119 (loss of 56 and 112 Da) in n-butyl-MMA are unique compared to SA di-ester. For n-butyl-SA the major product ions from the [M+H]+ molecular ion results from the loss of m/z 74 and 130 Da. The major product ions observed by the ESI-MS/MS of dicarboxylic acid dibutyl ester [M+1]+ as the precursor ion are presented in FIG. 3. The fragment ions B and D are common to n-butyl-esters of MMA and SA, however, the fragment ions A and C are significantly more intense in MMA. The observed difference in the fragmentation provides necessary level of specificity for the method.

Method Performance

The m/z 231→119 and m/z 231→175 fragmentation pathways are approximately 100 and 30 times more abundant for MMA n-butyl ester than for SA. In addition to lower intensity of the transitions for SA compared to MMA, branching ratio of the ions is significantly different between the compounds. Based on the difference in branching ratios of the product ions the proposed algorithm enables the calculation of the individual concentrations of each MMA and SA when both compounds are present in a sample. Within-run, between-run and total imprecision for the results determined from the control values observed over three weeks for the method utilization are presented in Table 2.

TABLE 2

Method imprecision for MMA analysis in presence of variable amount of SA.

| MMA, μmol/L | Within-run CV, % | Between-run CV, % | Total CV, % |
|---|---|---|---|
| 0.3* | 2.9 | 5.5 | 6.0 |
| 1.0* | 3.2 | 5.3 | 5.8 |
| 10# | na | 3.2 | na |
| 20# | na | 4.7 | na |

Figure 4:
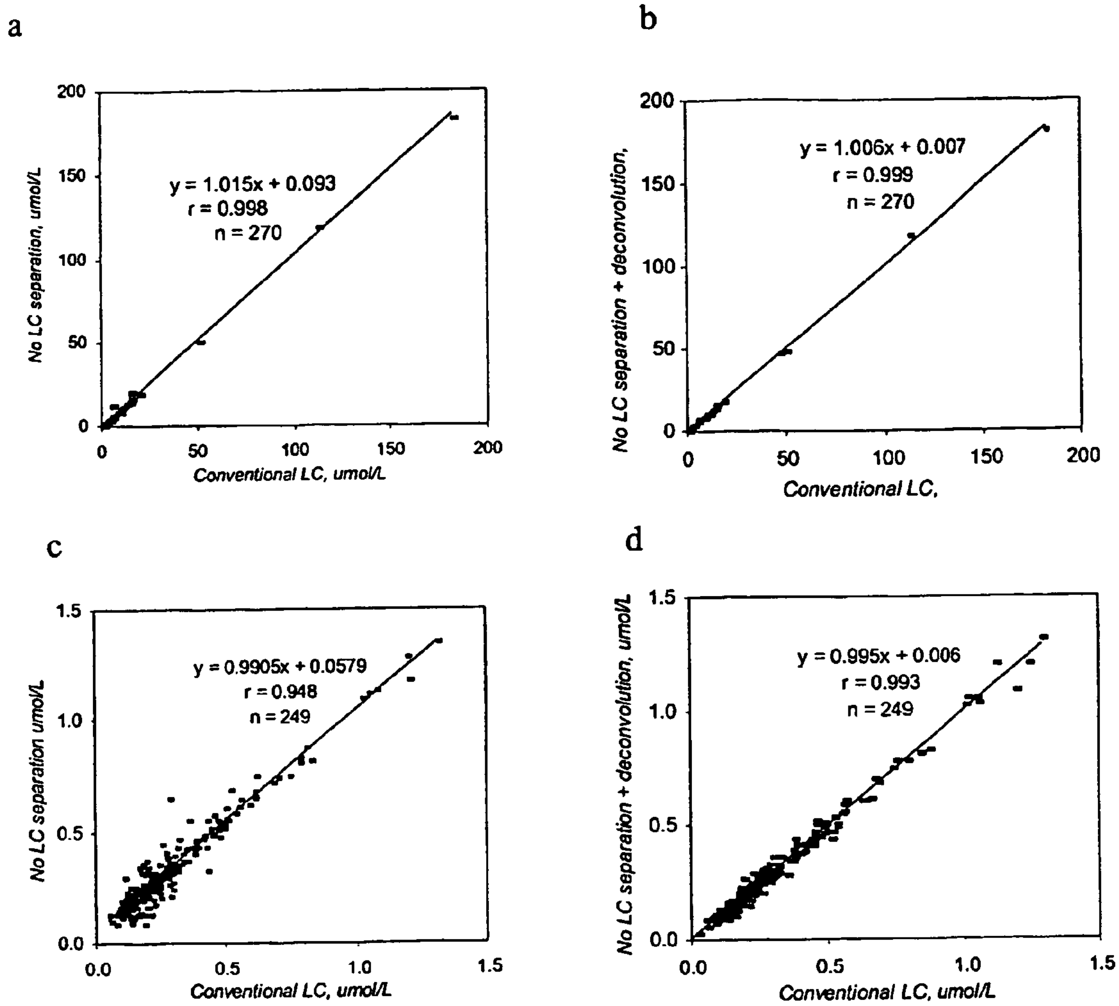
FIGS. 4A–4D depict an evaluation of methods according to the present invention and an LC-MS/MS method chromatographically resolving MMA and SA, according to an embodiment of the present invention.

*Serum samples, two to four replicates per run over 15 days
#Urine samples, one sample per run over 10 days The validity of the proposed approach for quantitative deconvolution was assessed through evaluation of the method agreement with the LC-MS/MS method chromatographically resolving MMA and SA (FIG. 4). The results of analysis of 270 samples included in the study were evaluated for agreement with raw results of the method utilizing no chromatographic separation of the isomers (FIGS. 4A and 4C), and with the same results treated by an embodiment of the above-described deconvolution method (FIGS. 4B and 4D). (Although the isomers are not separated from each other in this embodiment, they are generally separated from other potential interferences) For evaluation purpose all the results were combined in two groups: the first group contained results of analysis of all available samples, the second group (subgroup of the same set) contained results obtained by analysis of all the samples with concentration<1.5 mmol/L. Summary of the results is presented in Table 3. y-intercept values of the linear regression decreased by over 90%. The y-intercept value in the method without deconvolution represents SA contribution to the quantitation. Significant improvement was also observed in the values of slope, correlation coefficient and standard error. The improvement in quantitative results was the most dramatic for group of samples with MMA concentration<1.5 mmol/L (clinically important levels). The data indicate significant improvement in the agreement between methods when the deconvolution method was utilized.

TABLE 3

Regression equations, correlation coefficients and standard errors for the comparison between the methods for MMA analysis utilizing chromatographic separation of MMA and SA, and method without chromatographic separation with and without deconvolution algorithm.

| Method | Concentration range, μmol/L | Regression equation | Correlation coefficient, r | Standard error, $S_{y,x}$ |
|---|---|---|---|---|
| With deconvolution | 0–180 | y = 1.006 * x − 0.007 | 0.999 | 0.39 |
| | 0–1.5 | y = 0.995 * x − 0.006 | 0.986 | 0.025 |
| Without deconvolution | 0–180 | y = 1.015 * x − 0.093 | 0.998 | 0.57 |
| | 0–1.5 | y = 0.991 * x − 0.058 | 0.943 | 0.049 |

The comparative method (utilizing chromatographic separation) was utilized for analysis of over 30,000 human samples. No samples with peaks interfering with MMA, other than SA were observed in the samples. Further, no interference with utilized product ions of IS, d3-MMA, was observed.

We claim:

1. A method for deconvoluting contributions of a plurality of analytes in a sample comprising:

obtaining a tandem mass spectrometry or $MS^n$ signal comprising a mass spectrum comprising at least one peak intensity for each of said target analytes in said sample where each of said peak intensities corresponds to a mass transition and where more than one of said analytes contributes to at least one of said peak intensities;

providing a model comprising a system of linear equations relating said peak intensities to a contribution intensity for each of said analytes;

calculating said contribution intensities of each of said analytes using said model;

determining a branching ratio for each of said plurality of analytes at each of said mass transitions;

calculating signal corresponding to said individual analytes;

providing a calibration curve for at least one of said analytes relating contribution intensity to concentration; and determining, based on said calibration curve, a concentration of at least one analyte.

2. A method according to claim 1, wherein said sample is selected from the group consisting of: bodily fluids, environmental samples, biological warfare agent samples, research samples, purified samples, and raw samples.

3. A method according to claim 1, wherein one or more internal standards are utilized for said calibration curve.

4. A method according to claim 3, wherein said one or more internal standards are used to determine said concentration of said analyte.

5. A method according to claim 1, wherein one or more external standards are utilized for said calibration curve.

6. A method according to claim 5, wherein said one or more external standards are used to determine said concentration of said analyte.

7. A method according to claim 1, wherein the number of mass transitions is equal to or greater than the number of analytes.

8. A method according to claim 1, further comprising selecting said mass transitions such that said contributions of said plurality of analytes are resolvable.

9. A method for deconvoluting contributions of a plurality of analytes utilizing a tandem mass spectrometry or $MS^n$ signal, said method comprising:

obtaining a tandem mass spectrometry signal of a sample comprising a plurality of peak intensities, wherein more than one of said analytes in said sample contribute to at least one of said peak intensities;

providing a model relating said peak intensities to a contribution intensity for each of said analytes; wherein said model comprises representing said signal as a weighted sum of reference signals, where each reference signal corresponding to one of said analytes;

calculating said contribution intensities of each of said analytes using said model;

providing a calibration curve for at least one of said analytes relating contribution intensity to concentration; and determining, based on said calibration curve, a concentration of at least one analyte.

10. A method according to claim 9, wherein said model comprises a plurality of coefficients, each coefficient weighting one of said reference signals, said method further comprising:

obtaining said reference signals; and calculating said coefficients to provide a best fit to said signal.

11. A method according to claim 10, wherein said calculating of said coefficients comprises performing a least squares fit.

12. A method according to claim 9, further comprising:

performing a quantitative calibration with standards;

generating a calibration curve relating said coefficients or intensities to known concentrations of analytes; and quantitatively determining a concentration for each of said analytes.

13. A method according to claim 9, wherein one or more internal standards are utilized for said calibration curve.

14. A method according to claim 13, wherein said one or more internal standards are used to determine said concentration of said analyte.

15. A method according to claim 9, wherein one or more external standards are utilized for said calibration curve.

16. A method according to claim 15, wherein said one or more external standards are used to determine said concentration of said analyte.

17. A method for deconvoluting contributions of a plurality of analytes utilizing a tandem mass spectrometry or $MS^n$ signal, said method comprising:

obtaining a tandem mass spectrometry signal of a sample comprising a plurality of peak intensities, wherein a plurality of analytes in said sample contribute to at least one of said peak intensities;

providing a model relating said peak intensities to a contribution intensity for each of said analytes;

calculating said contribution intensities of each of said analytes using said model;

providing a calibration curve for at least one of said analytes relating contribution intensity to concentration; and determining, based on said calibration curve, a concentration of at least one analyte, wherein said plurality of analytes comprise isobars.

18. A method according to claim 17, wherein one or more internal standards are utilized for said calibration curve.

19. A method according to claim 18, wherein said one or more internal standards are used to determine said concentration of said analyte.

20. A method according to claim 17, wherein one or more external standards are utilized for said calibration curve.

21. A method according to claim 20, wherein said one or more external standards are used to determine said concentration of said analyte.

22. A method for deconvoluting contributions of a plurality of analytes utilizing a tandem mass spectrometry or $MS^n$ signal, said method comprising:

obtaining a tandem mass spectrometry signal of a sample comprising a plurality of peak intensities, wherein more than one analyte in said sample contribute to at least one of said peak intensities;

providing a model relating said peak intensities to a contribution intensity for each of said analytes;

calculating said contribution intensities of each of said analytes using said model;

providing a calibration curve for at least one of said analytes relating contribution intensity to concentration; and determining, based on said calibration curve, a concentration of at least one analyte, wherein said plurality of analytes comprise structural isomers.

23. A method according to claim 22, wherein one or more internal standards are utilized for said calibration curve.

24. A method according to claim 23, wherein said one or more internal standards are used to determine said concentration of said analyte.

25. A method according to claim 22, wherein one or more external standards are utilized for said calibration curve.

26. A method according to claim 25, wherein said one or more external standards are used to determine said concentration of said analyte.

27. A method for deconvoluting contributions of a plurality of analytes utilizing a tandem mass spectrometry or $MS^n$ signal, said method comprising:

obtaining a tandem mass spectrometry signal of a sample comprising a plurality of peak intensities, wherein more than one analyte in said sample contribute to at least one of said peak intensities;

providing a model relating said peak intensities to a contribution intensity for each of said analytes;

calculating said contribution intensities of each of said analytes using said model;

providing a calibration curve for at least one of said analytes relating contribution intensity to concentration; and determining, based on said calibration curve, a concentration of at least one analyte, wherein said plurality of analytes comprise methylmalonic and succinic acids.

28. A method according to claim 27, wherein one or more internal standards are utilized for said calibration curve.

29. A method according to claim 28, wherein said one or more internal standards are used to determine said concentration of said analyte.

30. A method according to claim 27, wherein one or more external standards are utilized for said calibration curve.

31. A method according to claim 30, wherein said one or more external standards are used to determine said concentration of said analyte.

32. A method for deconvoluting contributions of a plurality or analytes utilizing a tandem mass spectrometry or $MS^n$ signal, said method comprising:

obtaining a tandem mass spectrometry signal of a sample comprising a plurality of peak intensities, wherein more than one analyte in said sample contribute to at least one of said peak intensities;

providing a model relating said peak intensities to a contribution intensity for each of said analytes;

calculating said contribution intensities of each of said analytes using said model;

providing a calibration curve for at least one of said analytes relating contribution intensity to concentration; and determining, based on said calibration curve, a concentration of at least one analyte, wherein said plurality of analytes comprised of unfragmented ions or fragment ions from said sample.

33. A method according to claim 32, wherein one or more internal standards are utilized for said calibration curve.

34. A method according to claim 33, wherein said one or more internal standards are used to determine said concentration of said analyte.

35. A method according to claim 32, wherein one or more external standards are utilized for said calibration curve.

36. A method according to claim 35, wherein said one or more external standards are used to determine said concentration of said analyte.

37. A method for deconvoluting contributions of a plurality of analytes utilizing a tandem mass spectrometry or $MS^n$ signal, said method comprising:

obtaining a tandem mass spectrometry signal of a sample comprising a plurality of peak intensities, wherein more than one analyte in said sample contribute to at least one of said peak intensities;

providing a model relating said peak intensities to a contribution intensity for each of said analytes;

calculating said contribution intensities of each of said analytes using said model;

providing a calibration curve for at least one of said analytes relating contribution intensity to concentration; and determining, based on said calibration curve, a concentration of at least one analyte, wherein said mass spectrometry signal comprises an integrated signal from a plurality of scans.

38. A method according to claim 37, wherein one or more internal standards are utilized for said calibration curve.

39. A method according to claim 38, wherein said one or more internal standards are used to determine said concentration of said analyte.

40. A method according to claim 37, wherein one or more external standards are utilized for said calibration curve.

41. A method according to claim 40, wherein said one or more external standards are used to determine said concentration of said analyte.

42. A method for deconvoluting contributions of a plurality of analytes utilizing a tandem mass spectrometry or $MS^n$ signal, said method comprising:

obtaining a tandem mass spectrometry signal of a sample comprising a plurality of peak intensities, wherein more than one analyte in said sample contribute to at least one of said peak intensities;

providing a model relating said peak intensities to a contribution intensity for each of said analytes;

calculating said contribution intensities of each of said analytes using said model;

providing a calibration curve for at least one of said analytes relating contribution intensity to concentration; and determining, based on said calibration curve, a concentration of at least one analyte, wherein said mass spectrometry signal comprises scans, and said deconvolution comprises deconvoluting from a plurality of scans followed by integration.

43. A method according to claim 42, wherein one or more internal standards are utilized for said calibration curve.

44. A method according to claim 43, wherein said one or more internal standards are used to determine said concentration of said analyte.

45. A method according to claim 42, wherein one or more external standards are utilized for said calibration curve.

46. A method according to claim 45, wherein said one or more external standards are used to determine said concentration of said analyte.

47. A method for deconvoluting contributions of a plurality of analytes utilizing a tandem mass spectrometry or $MS^n$ signal, said method comprising:

obtaining a tandem mass spectrometry signal of a sample comprising a plurality of peak intensities, wherein more than one analyte in said sample contribute to at least one of said peak intensities;

providing a model relating said peak intensities to a contribution intensity for each of said analytes;

calculating said contribution intensities of each of said analytes using said model;

providing a calibration curve for at least one of said analytes relating contribution intensity to concentration; and determining, based on said calibration curve, a concentration of at least one analyte, wherein said sample is analyzed utilizing a chromatographic separation.

48. A method according to claim 47, wherein one or more internal standards are utilized for said calibration curve.

49. A method according to claim 48, wherein said one or more internal standards are used to determine said concentration of said analyte.

50. A method according to claim 47, wherein one or more external standards are utilized for said calibration curve.

51. A method according to claim 50, wherein said one or more external standards are used to determine said concentration of said analyte.

52. A method for deconvoluting contributions of a plurality of analytes utilizing a tandem mass spectrometry or $MS^n$ signal, said method comprising:

obtaining a tandem mass spectrometry signal of a sample comprising a plurality of peak intensities, wherein more than one analyte in said sample contribute to at least one of said peak intensities;

providing a model relating said peak intensities to a contribution intensity for each of said analytes;

calculating said contribution intensities of each of said analytes using said model;

providing a calibration curve for at least one of said analytes relating contribution intensity to concentration; and determining, based on said calibration curve, a concentration of at least one analyte, wherein no chromatographic separation is performed on said sample.

53. A method according to claim 52, wherein one or more internal standards are utilized for said calibration curve.

54. A method according to claim 53, wherein said one or more internal standards are used to determine said concentration of said analyte.

55. A method according to claim 54, wherein said one or more external standards are used to determine said concentration of said analyte.

56. A method according to claim 52, wherein one or more external standards are utilized for said calibration curve.

* * * * *

UNITED STATES PATENT AND TRADEMARK OFFICE

CERTIFICATE OF CORRECTION

PATENT NO. : 7,158,903 B2 Page 1 of 1
APPLICATION NO. : 10/508068
DATED : January 2, 2007
INVENTOR(S) : Mark M. Kushnir et al.

It is certified that error appears in the above-identified patent and that said Letters Patent is hereby corrected as shown below:

IN THE CLAIMS

Col. 19, line 22, change “or analytes” to --of analytes--.

Signed and Sealed this

Seventeenth Day of April, 2007

JON W. DUDAS
*Director of the United States Patent and Trademark Office*